(12) United States Patent
Hagiwara et al.

(10) Patent No.: US 9,415,796 B2
(45) Date of Patent: Aug. 16, 2016

(54) STEERING APPARATUS

(71) Applicant: NSK Ltd., Tokyo (JP)

(72) Inventors: Wataru Hagiwara, Maebashi (JP);
Masaya Jouta, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/438,878

(22) PCT Filed: Oct. 10, 2014

(86) PCT No.: PCT/JP2014/077200
§ 371 (c)(1),
(2) Date: Apr. 27, 2015

(87) PCT Pub. No.: WO2015/064344
PCT Pub. Date: May 7, 2015

(65) Prior Publication Data
US 2016/0167695 A1      Jun. 16, 2016

(30) Foreign Application Priority Data

Oct. 31, 2013   (JP) .................................. 2013-226950
Dec. 25, 2013   (JP) .................................. 2013-266965

(51) Int. Cl.
*B62D 1/184*      (2006.01)
*B62D 1/19*       (2006.01)

(52) U.S. Cl.
CPC ................ *B62D 1/195* (2013.01); *B62D 1/184* (2013.01); *B62D 1/192* (2013.01)

(58) Field of Classification Search
CPC ......... B62D 1/184; B62D 1/192; B62D 1/195
See application file for complete search history.

(56) References Cited

U.S. PATENT DOCUMENTS

| 4,892,330 A | * | 1/1990 | Beauch ................. B62D 1/184 |
| | | | 280/775 |
| 5,560,650 A | * | 10/1996 | Woycik .................. B62D 1/192 |
| | | | 280/777 |

(Continued)

FOREIGN PATENT DOCUMENTS

| EP | 1634796 A1 | 3/2006 |
| EP | 1762462 A1 | 3/2007 |

(Continued)

OTHER PUBLICATIONS

International Search Report from International Patent Application No. PCT/JP2014/077200, Jan. 6, 2015.

(Continued)

*Primary Examiner* — Laura Freedman
(74) *Attorney, Agent, or Firm* — Shapiro, Gabor and Rosenberger, PLLC

(57) ABSTRACT

A steering apparatus is disclosed, the apparatus including: friction plates 23, 24a, 24b fastened by a fastening mechanism with a clamp portion and a vehicle-sided bracket 6; and an annular member 20 fitted on an inner column 3 and connected to the friction plates 23, 24a, 24b, the annular member 20 and the inner column 3 being formed with through-holes 20a, 3a penetrating the annular member 20 and the inner column 3 in the vicinity of a connecting portion between the friction plates 23, 24a, 24b and the annular member 20 and being connected by a pin 21 inserted into the through-holes 20a, 3a, the pin being fractured upon receiving predetermined impact force, resulting in canceling the connection between the annular member 20 and the inner column 3 to enable a more stable and lower separating load to be acquired.

10 Claims, 12 Drawing Sheets

(56) References Cited

U.S. PATENT DOCUMENTS

| | | | | |
|---|---|---|---|---|
| 5,876,065 | A * | 3/1999 | Ogura | B62D 1/197 280/777 |
| 6,134,982 | A * | 10/2000 | Takabatake | B62D 1/184 280/777 |
| 7,410,190 | B2 * | 8/2008 | Sawada | B62D 1/19 180/427 |
| 9,283,984 | B2 * | 3/2016 | Matsuno | B62D 1/187 |
| 2006/0125224 | A1 | 6/2006 | Higashino et al. | |
| 2007/0068311 | A1 | 3/2007 | Shimoda et al. | |
| 2008/0042420 | A1 * | 2/2008 | Ali | B62D 1/184 280/775 |
| 2013/0133460 | A1 * | 5/2013 | Uesaka | B62D 1/195 74/492 |
| 2015/0344062 | A1 * | 12/2015 | Johta | B62D 1/184 74/493 |
| 2015/0353123 | A1 * | 12/2015 | Jyota | B62D 1/187 74/493 |
| 2016/0016604 | A1 * | 1/2016 | Johta | B62D 1/184 74/493 |
| 2016/0039450 | A1 * | 2/2016 | Johta | B62D 1/184 74/493 |

FOREIGN PATENT DOCUMENTS

| | | |
|---|---|---|
| JP | 02-064469 U | 5/1990 |
| JP | 2001-278069 A | 10/2001 |
| JP | 2003-276616 A | 10/2003 |
| JP | 2004-034883 A | 2/2004 |
| JP | 2006-131047 A | 5/2006 |
| JP | 2007-030527 A | 2/2007 |
| JP | 2007-069800 A | 3/2007 |
| JP | 2009-132358 A | 6/2009 |
| JP | 2011-105230 A | 6/2011 |
| WO | WO 2004-108502 A1 | 12/2004 |

OTHER PUBLICATIONS

Written Opinion of the ISA from International Patent Application No. PCT/JP2014/077200, Jan. 6, 2015.

English Translation of International Preliminary Report on Patentability from International Patent Application No. PCT/JP2014/077200, mailed May 12, 2016.

* cited by examiner

STEERING APPARATUS

TECHNICAL FIELD

The present invention relates to a steering apparatus equipped in a vehicle etc and capable of adjusting a position in a telescopic direction, i.e., a position in a direction of an axis of a rotation of a steering wheel and a position in a tilt direction, i.e., a position, in a vertical direction, of the steering wheel rotating about a portion, on a front side of a vehicle, of the steering apparatus in accordance with a physical constitution and a driving posture of a driver.

BACKGROUND ART

A conventional steering apparatus has existed so far, the apparatus including a mechanism to reduce a damage to the driver while moderating an impact exerted on the driver by displacing the steering wheel toward a front of the vehicle upon the driver's colliding with the steering wheel due to an accident of collision.

For example, as in Patent literature 1 given below, there exists a steering apparatus equipped with a clamp device that firmly clamps a column to a vehicle fitting bracket by use of a friction plate, the configuration being such that a part of the friction plate is deformed to cancel fixation of the friction plate when a predetermined and larger level of impact force acts due to a collision load.

Further, as in Patent literature 2 given below, there exists a steering apparatus configured so that a nut fitted to a lower portion of an inner column disposed on an upper side of the apparatus as a driven member for a position adjustment in the telescopic direction is detached based on an impact load applied upon a secondary collision.

Moreover, as in Patent literature 3 given below, there exists a steering apparatus configured so that a steering column is fixed to a vehicle body while a part of the steering column is covered by a column jacket, there is provided a bottomed groove extending from the portion covered by the column jacket toward a front side of a vehicle and being shallow in depth on the rear side of the vehicle, and a pin fixed to the column jacket abuts on the bottomed groove to restrict a relative movement between the column jacket and the steering column.

Still further, as in Patent literature 4 given below, there exists a steering apparatus that absorbs an impact energy upon the secondary collision by an impact absorbing wire of which a rear end hangs on a clamping bolt around or by deforming a support groove receiving insertion of the clamping bolt upon the secondary collision.

PRIOR ART LITERATURES

Patent Literatures

Patent literature 1: Japanese Patent Application Laid-Open Publication No. 2007-69800

Patent literature 2: Japanese Patent Application Laid-Open Publication No. 2007-30527

Patent literature 3: Japanese Utility Model Publication No. H02-64469

Patent literature 4: Japanese Patent Application Laid-Open Publication No. 2001-278069

SUMMARY OF THE INVENTION

Problems to be Solved by the Invention

In the case of a structure of restricting a movement of the steering column on each of laterally both sides of the steering column, however, an apprehension is that unless it is manufactured so that the movement is restricted by uniform force on laterally both sides, a load for the steering column to separate from a fixed state, i.e., a separating load differs respectively on laterally both sides of the column, and the column is twisted to increase the separating load to some extent, resulting in inability of stably acquiring an intended separating load.

Further, in a structure to provide a separating portion with a friction surface substantially vertical to a tilt direction, another apprehension is that a contact pressure of the friction surface changes due to a load acting upward in the tilt direction upon the secondary collision, and the friction force also changes to cause a slight variation of the separating load, resulting in the inability of stably acquiring the intended separating load.

It is an object of the present invention in view of the problems described above to provide a steering apparatus capable of acquiring a more stable and lower separating load.

Means for Solving the Problems

In order to solve the problems described above, the present invention provides a steering apparatus including:

a steering shaft transferring steering force;

an inner column rotatably supporting a steering shaft;

an outer column supporting the steering shaft rotatably and including a clamp portion clamping the inner column while being fitted on the inner column in a relatively movable manner in an axial direction;

a vehicle-sided bracket pinching and fixing the clamp portion to the vehicle body; and a fastening mechanism fixing the inner column and the outer column by fastening the vehicle-sided bracket and the clamp portion in accordance with an operation of a user, then cancelling the fixation and thus enabling adjustments in a tilt and telescopic directions of a steering wheel, wherein the steering apparatus further comprises: a friction plate fastened by the fastening mechanism together with the clamp portion and the vehicle-sided bracket; and an annular member being fitted on the inner column and connected to the friction plate, the annular member and the inner column are formed with through-holes penetrating the annular member and the inner column in the vicinity of a connecting portion between the friction plate and the annular member, and are connected by a pin inserted into the through-holes, and the pin is fractured upon receiving a predetermined level of impact force, resulting in canceling the connection between the annular member and the inner column.

This configuration enables acquisition of a more stable and lower separating load.

Preferably, the friction plate and the annular member are connected by a fitting portion formed on the friction plate and fixed in surface-contact with an outer peripheral surface of the annular member, and the fitting portion blocks at least a part of the through-hole.

With this contrivance, the pin can be prevented from coming off without requiring a special work. Particularly, upon the secondary collision, the pin does not come off, and hence a stable impact absorbing function can be exhibited.

Further preferably, the fitting portion includes a hole for visually observing the pin, the hole being formed in a portion facing the shearing pin.

With this contrivance, it can be checked through the visual observation whether the pin exists or not.

Still further, preferably, the connecting portion and the through-hole are formed in a lower portion of the annular member.

With this contrivance, it is feasible to minimize an influence exerted on the pin by the load acting upward in the tilt direction upon the secondary collision.

Yet further, preferably, the steering apparatus further includes a second pin, the annular member and the inner column are each formed with a second through-hole into which the second pin is inserted, and the through-hole and the second through-hole are formed in side surfaces in a face-to-face relationship in radial directions.

With this contrivance, the column and the bracket can be prevented from being twisted due to the load upon the pin being sheared. Moreover, the apparatus is hard to be affected by the load acting upward in the tilt direction and by a displacement due to the load upon the secondary collision.

Moreover, preferably the pin is configured to include a resin.

With this contrivance, strength of the pin can be easily set appropriate.

Effect of the Invention

The present invention can provide the steering apparatus capable of acquiring the more stable and lower separating load.

MODE FOR CARRYING OUT THE INVENTION

First Embodiment

Figure 1:
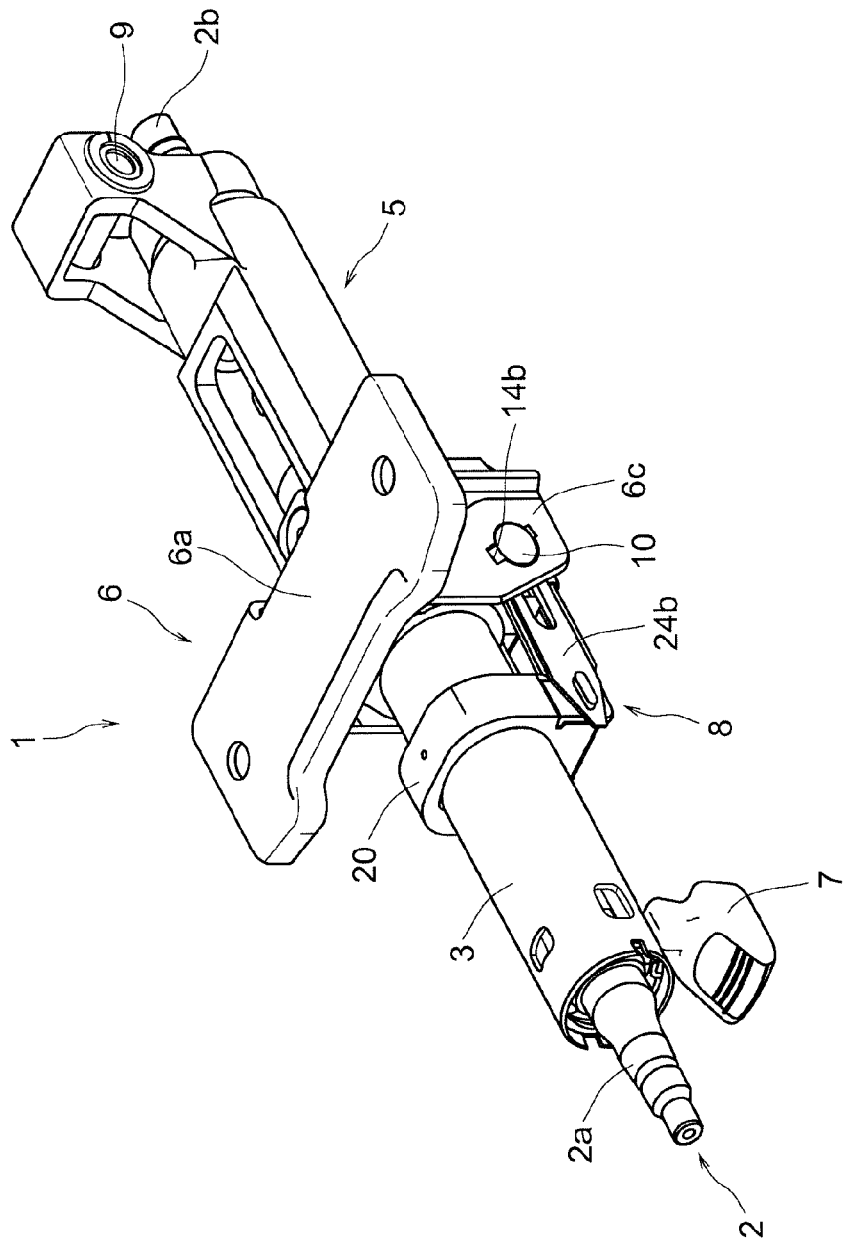
FIG. 1 is a perspective view illustrating a steering apparatus according to a first embodiment of the present application.

A steering apparatus 1 according to a first embodiment of the present application will hereinafter be described with reference to FIGS. 1 to 7 inclusive. FIG. 1 is a perspective view illustrating the steering apparatus 1 according to the first embodiment of the present application. When viewed in a direction of normally reading the reference numerals and symbols in FIG. 1, a leftward lower side as facing FIG. 1 corresponds to a rear side of a vehicle on the occasion of securing the steering apparatus 1 to the vehicle, while a rightward upper side as facing FIG. 1 corresponds to a front side of the vehicle on the occasion of securing the steering apparatus 1 to the vehicle. In FIG. 1, a direction of rotation about a central axis of the steering apparatus 1 is coincident with a state of securing the steering apparatus 1 to the vehicle. Note that left and right sides with respect to the steering apparatus 1 connote the left and right sides when the steering apparatus 1 is viewed from a driver's side in the present application.

The steering apparatus 1 includes: a steering shaft 2 transferring rotations of unillustrated steering wheel fitted to the rear side of the vehicle to the front side of the vehicle; an inner column 3 rotatably supporting a portion, on the rear side of the vehicle, of the steering shaft 2; an outer column 5 receiving internal insertion of a portion, on the front side of the vehicle, of the inner column 3 and rotatably supporting a portion, on the front side of the vehicle, of the steering shaft 2; a vehicle-sided bracket 6 disposed in the periphery of a portion, on the rear side of the vehicle, of the outer column 5 and fixing the steering apparatus 1 to the vehicle; an operation lever 7 used for locking and unlocking a position in a tilt direction and a position in a telescopic direction of the unillustrated steering wheel; and a reinforcing member 8 reinforcing the fixation of the inner column.

The steering shaft 2 is configured to include: an upper shaft 2a disposed on the rear side of the vehicle, the steering wheel being fitted to the upper shaft 2a; and a lower shaft 2b being spline-engaged with the upper shaft 2a on the front side of the vehicle. Note that a direction in which the steering shaft 2 extends is referred to as an "axial direction" in the present application.

A tilt pivot 9 serving as a center of a tilt rotation is provided on an upper portion, on the front side of the vehicle, of the outer column 5. When a driver operates the unlocking with the operation lever 7, the steering apparatus 1 is enabled to rotate about the tilt pivot 9.

The vehicle-sided bracket 6 is disposed in the periphery of an end portion, on the rear side of the vehicle, of the outer column 5 and is configured to include: an upper plate portion 6a fixed to a vehicle body in an undetachable manner; and side plate portions 6b, 6c extending respectively on laterally both sides of the outer column 5 from the upper plate portion 6a. The side plate portions 6b, 6c are formed with elongate holes 14a, 14b each taking a circular arc with the tilt pivot 9 being centered, a clamping bolt 10 passing through the elongate holes 14a, 14b. Note that the elongate hole 14a is not illustrated in FIG. 1.

Figure 2:
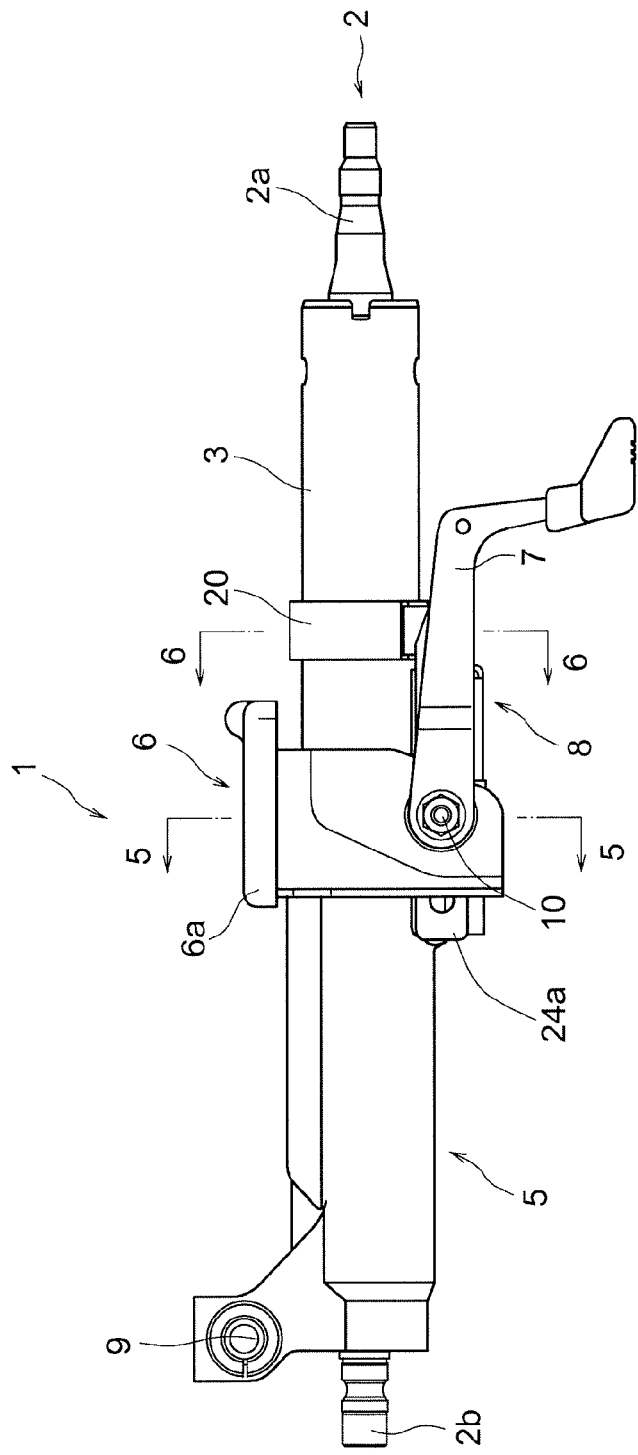
FIG. 2 is a side view illustrating the steering apparatus according to the first embodiment of the present application.

FIG. 2 is a side view of the steering apparatus 1 according to the first embodiment of the present application, illustrating surfaces disposed on the left side of the vehicle when the steering apparatus 1 is secured to the vehicle. In FIG. 2, when viewed in the direction of normally reading the reference numerals and symbols, the left side as facing the drawing corresponds to the front side of the vehicle, while the right side as facing the drawing corresponds to the rear side of the vehicle.

An end portion, on the front side of the vehicle, of the operation lever 7 is fitted on the clamping bolt 10, and a user operates the operation lever 7 and is thereby enabled to fix the steering column and cancel the fixation thereof. In other words, the operation lever 7 is configured to be rotatable about the clamping bolt 10, and, upon the user's rotating the operation lever 7 in one direction, the clamping bolt 10 clamps the side plates portion 6b, 6c to get close to each other, thereby restricting movements of the inner column 3 and the upper shaft 2a in the tilt and telescopic directions. When the user rotates the operation lever 7 in an opposite direction, the clamping bolt 10 declamps the side plates portion 6b, 6c to allow the movements of the inner column 3 and the upper shaft 2a in the tilt and telescopic directions, and the user is therefore enabled to adjust the positions of the steering wheel in the tilt and telescopic directions.

Figure 3:
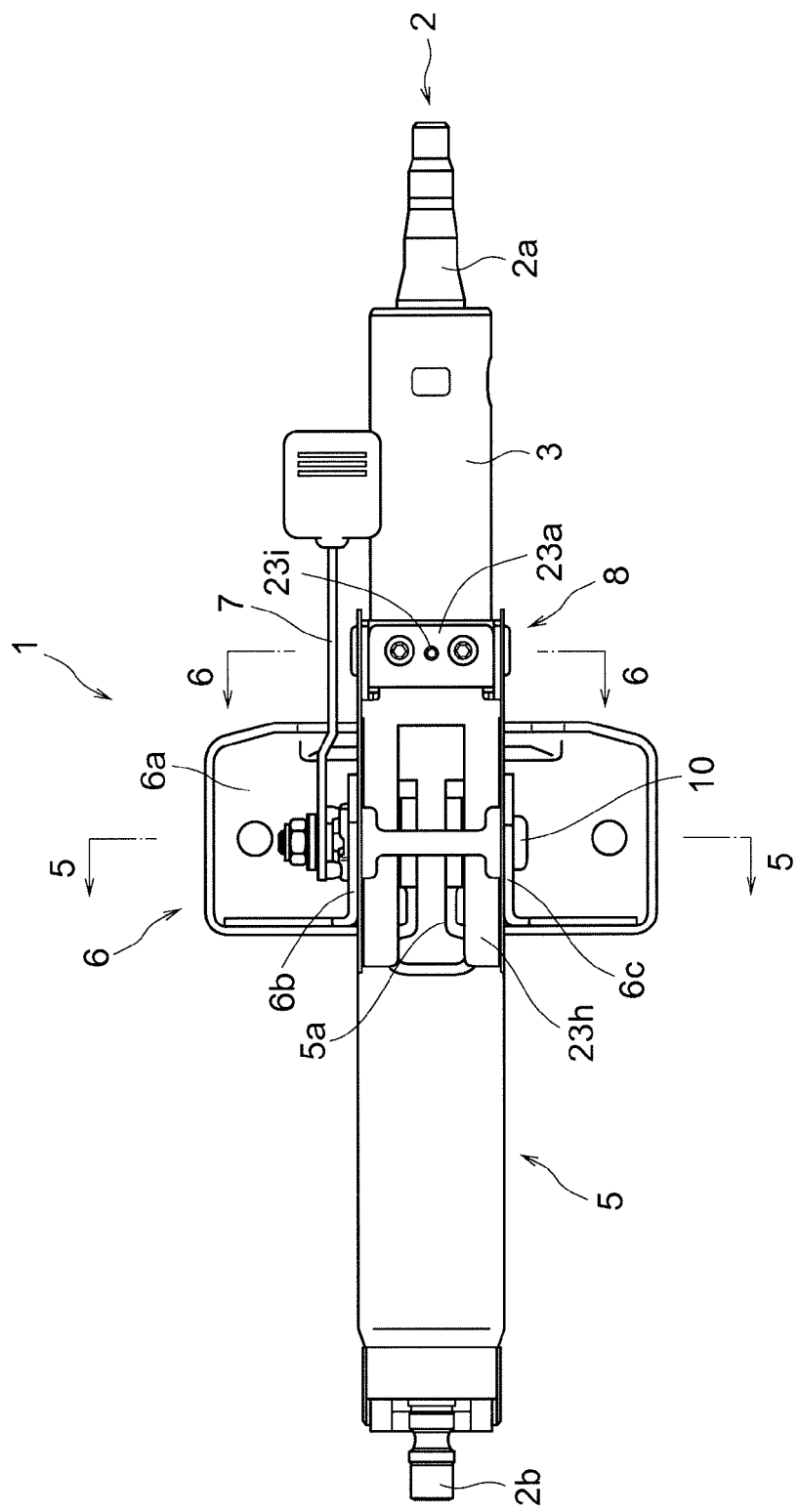
FIG. 3 is a bottom view illustrating the steering apparatus according to the first embodiment of the present application.

FIG. 3 is a bottom view of the steering apparatus 1 according to the first embodiment of the present application, illustrating surfaces viewed as lower surfaces when securing the steering apparatus 1 to the vehicle. In FIG. 3, when viewed in the direction of normally reading the reference numerals and symbols, the left side as facing the drawing corresponds to the front side of the vehicle, while the right side as facing the drawing corresponds to the rear side of the vehicle.

A part of the after-mentioned reinforcing member 8 is disposed in a lower portion vicinal to a fitting portion between the inner column 3 and the outer column 5.

A slit portion 5a configuring a slit extending in the axial direction to penetrate the outer column 5 toward the rear side of the vehicle and spreading in a peripheral direction at an end portion on the front side of the vehicle, is formed at a lower portion, on the rear side of the vehicle, of the outer column 5. The slit portion 5a allows a portion, on the rear side of the vehicle, of the outer column 5 to become elastically deformed by the clamping of the clamping bolt 10, thus enabling the inner column 3 to be embraced by clamping force.

Figure 4:
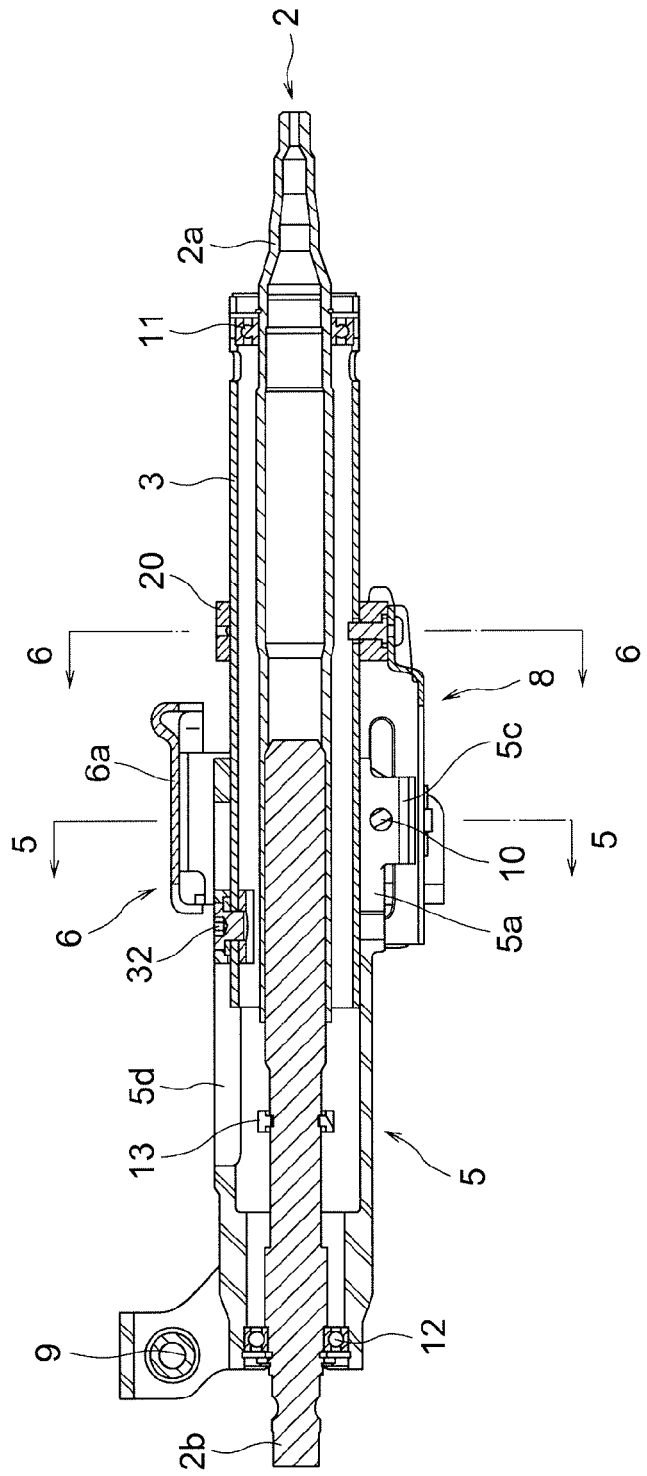
FIG. 4 is a sectional view illustrating a cut-off plane taken in a vertical direction along a central axis of the steering apparatus according to the first embodiment of the present application.

FIG. 4 is a sectional view depicting a cut-off plane being cut off in a vertical direction along a central axis of the steering apparatus 1 according to the first embodiment of the present application. In FIG. 4, when viewed in the direction of normally reading the reference numerals and symbols, the left side as facing the drawing corresponds to the front side of the vehicle, while the right side as facing the drawing corresponds to the rear side of the vehicle.

The upper shaft 2a is formed in a substantially cylindrical shape, while the lower shaft 2b is formed in a substantially column shape, and a portion, on the rear side of the vehicle, of the lower shaft 2b is fitted in a portion, on the front side of the vehicle, of the upper shaft 2a, thus attaining the spline-engagement between the upper shaft 2a and the lower shaft 2b at these portions. The steering shaft 2 is thereby enabled to change its length when making a telescopic adjustment and when relaxing an impact upon a secondary collision. A key lock collar, with which to engage a lock pin of a steering lock device for preventing the vehicle from being stolen, may be fitted on the upper shaft 2a.

A rear-sided bearing 11 fixed by a C-ring is fitted in the vicinity of an end portion, on the rear side of the vehicle, of the inner column 3. The upper shaft 2a is rotatably supported by the rear-sided bearing 11. The upper shaft 2a is fixed to the inner column 3 to be disabled from relatively moving in the axial direction but allowed to move together with the inner column 3 in the axial direction when making the telescopic adjustment and upon the secondary collision.

The C-ring, a washer and an O-ring are disposed in this sequence from the front side of the vehicle in the vicinity of the end portion, on the front side of the vehicle, of the outer column 5 to eliminate a backlash, and a front-sided bearing 12 for making alignment against a deviation from the center of the spline engagement is also fitted in the vicinity thereof. The lower shaft 2b is rotatably supported by the front-sided bearing 12.

Protruded portions 5b, 5c each protruding downward are formed at a lower portion of the slit portion 5a of the outer column 5. The clamping bolt 10 passes through a hole formed to penetrate a boundary portion in the widthwise direction of the vehicle between the slit portion 5a and the protruded portions 5b, 5c. Note that the protruded portion 5b is not illustrated in FIG. 4.

A resinous stopper 13 is fitted on an intermediate portion of the lower shaft 2b in the axial direction. The stopper 13 serves to restrict a further movement of the upper shaft 2a toward the front side of the vehicle when making the telescopic adjustment. The stopper 13 is configured to become detached upon receiving a fixed level of impact due to the secondary collision from the upper shaft 2a. The stopper 13 being composed of the resin, noises can be restrained when making the telescopic adjustment. Note that the invention may adopt a configuration of not providing the stopper 13.

The outer column 5 includes an elongate hole portion 5d configuring an elongate hole penetrating in a radial direction and extending in the axial direction, the elongate hole portion 5d being formed on the upper side of the outer column 5. A stopper 32 fixed to an upper portion, on the front side of the vehicle, of the inner column 3 is disposed inwardly of the elongate hole portion 5b. The stopper 32 engages with a side surface of the elongate hole portion 5b to restrain the rotation of the inner column 3, and engages with a portion, on the rear side of the vehicle, of the elongate hole portion 5b to define a maximum draw-out quantity when making the telescopic adjustment, and performs a role of a guide for guiding a direction of the movement of the inner column 3 upon the secondary collision. The stopper 32 is equipped with a resinous spacer 15 at a portion in a face-to-face relationship with the elongate hole portion 5b. With this contrivance, it is feasible to restrain the noises caused when making the telescopic adjustment of the steering wheel.

A metallic annular member 20 is loosely fitted on an intermediate portion of the inner column 3 in the axial direction. A lower portion of the annular member 20 is fixed by the after-mentioned reinforcing member 8 clamped together with the side plate portions 6b, 6c by the clamping bolt 10.

Figure 5:
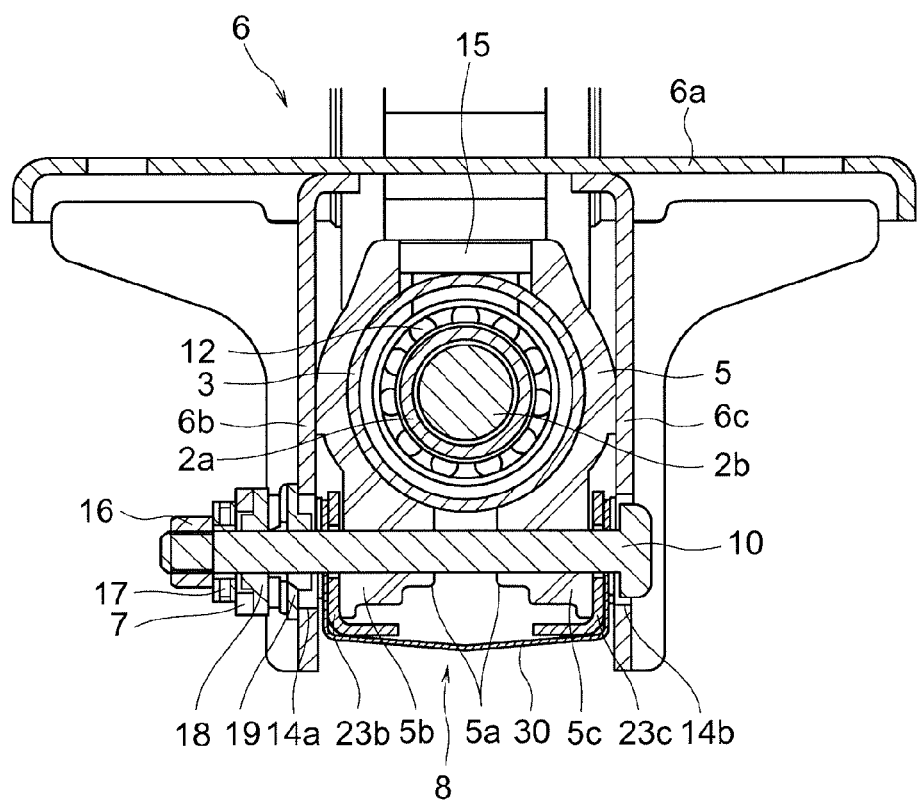
FIG. 5 is a sectional view, taken along a line 5-5 depicted in FIGS. 2 to 4 inclusive, of the steering apparatus according to the first embodiment of the present application.

FIG. 5 is a sectional view of the steering apparatus 1 according to the first embodiment of the present application, the section being taken along a line 5-5 depicted in FIGS. 2 to 4 inclusive. In FIG. 5, the upper and lower sides of the steering apparatus 1 are substantially coincident with upper and lower sides in a state of being mounted on the vehicle.

The outer column 5 has a clamp portion, inclusive of the slit portion 5a and the protruded portion 5b, disposed in the vicinity of the clamping bolt 10, the clamp portion configuring a clamping unit elastically becoming deformed to clamp and embrace the inner column 3.

Surfaces of laterally both sides of a portion, disposed between the side plate portions 6b, 6c, of the outer column 5 slide on the side plate portions 6b, 6c of the vehicle-sided bracket 6 when adjusting the tilt position.

A male thread is formed on a shank, on the left side of the vehicle, of the clamping bolt 10, and a nut 16 is screwed to this male thread. A thrust bearing 17, the operation lever 7, a movable cam 18 fixed to the operation lever 7 in a relative rotation disabled manner, a fixed cam 19 corresponding to the movable cam 18 and fitted in the elongate hole 14a of the side plate portion 6b in the unrotatable manner, the side plate portion 6b and a part of the after-mentioned reinforcing member 8 are interposed in this sequence from the nut 16 between the nut 16 and the protruded portion 5b of the outer column 5.

A part of the reinforcing member 8 and the side plate portion 6c are further interposed in this sequence from the protruded portion 5c between the protruded portion 5c of the outer column 5 and a head of the clamping bolt 10.

Figure 6:
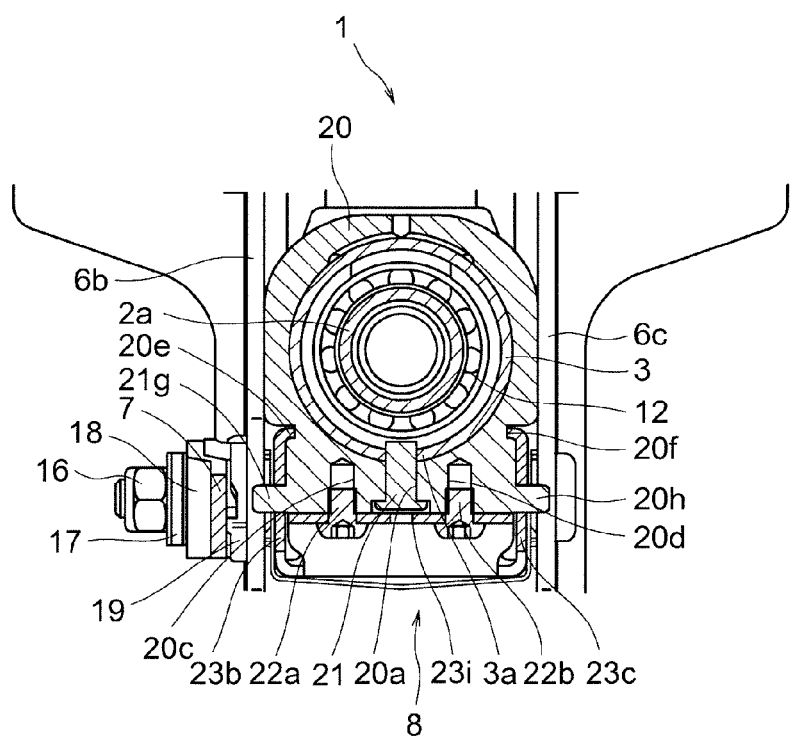
FIG. 6 is a sectional view, taken along a line 6-6 depicted in FIGS. 2 to 4 inclusive, of the steering apparatus according to the first embodiment of the present application.

FIG. 6 is a sectional view of the steering apparatus 1 according to the first embodiment of the present application, the section being taken along a line 6-6 depicted in FIGS. 2 to 4 inclusive. In FIG. 6, the upper and lower sides of the steering apparatus 1 are substantially coincident with the upper and lower sides in the state of being mounted on the vehicle.

A lower portion of the annular member 20 is formed thicker than left and right side portions thereof, and a hole 20a penetrating in a vertical direction is formed in a central portion of the lower portion. A hole 3a is formed in a portion, opposite to the upper edge of the hole 20a, of the inner column 3, the hole 3a configuring a through-hole penetrating an interior of the inner column 3 from the lower edge of the annular member 20 continuously to the hole 20a. The hole 20a forms an internal space taking a substantially circular column shape, and a lower edge thereof has a counterbore being larger in dimension of an inside diameter than those of other portions.

A resinous pin 21 having a shank taking a circular column shape and a disc-like head with a larger diameter than the shank passes through the through-hole configured to include the hole 20a and the hole 3a. The counterbore of the hole 20a receives the head of the pin 21. The pin 21 fixes the annular member 20 to the inner column 3.

Screw holes 20c, 20d are formed upward from downward on laterally both sides of the hole 20a of the annular member 20, and screws 22a, 22b are screwed into the screw holes 20c, 20d via after-mentioned holes 23j, 23k formed in a fitting portion 23a of an inner friction plate 23, thereby fitting the after-mentioned fitting portion 23a of the inner friction plate 23 to the annular member 20.

The fitting portion 23a of the inner friction plate 23 being thus fitted to the annular member 20, the annular member 20 is fixed integrally to the reinforcing member 8, and the pin 21 can be also prevented from coming off. A hole 23i is formed in a portion, facing the pin 21, of the fitting portion 23a of the inner friction plate 23. The hole 23i enables a visual observation of the pin 21 being fitted in an assembling process etc.

Further, recessed portions 20e, 20f being recessed inward from laterally both sides in the widthwise direction of the vehicle are formed in a boundary portion between the lower thick portion and the upper portion on this thick portion of the annular member 20. Upper inwardly bent end portions of after-mentioned rising portions 23b, 23c of the inner friction plate 23 are caught in the recessed portions 20e, 20f. Moreover, protruded portions 20g, 20h protruding on laterally both sides in the widthwise direction of the vehicle and each taking an oblong shape being elongate in the axial direction, are formed on laterally both side surfaces of the lower edge of the annular member 20. Open slots 23d, 23e respectively formed in portions, on the rear side of the vehicle, of the rising portions 23b, 23c of the inner friction plate 23, are fitted on the protruded portions 20g, 20h, and elongate hole portions 25a, 25b formed in after-mentioned outer friction plates 24a, 24b are further fitted on the protruded portions 20g, 20h from outside in the widthwise direction of the vehicle.

Figure 7:
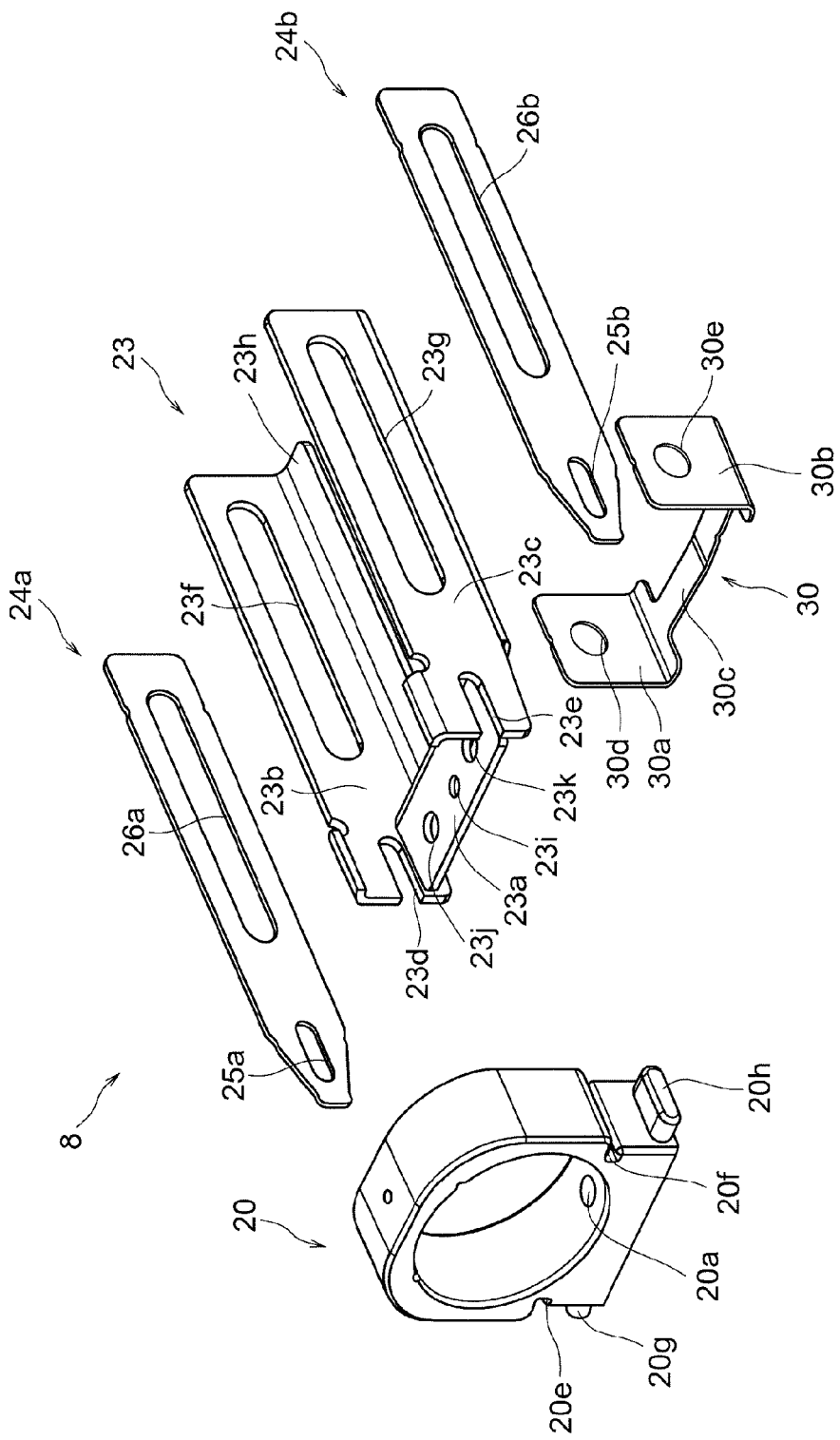
FIG. 7 is an exploded perspective view illustrating a reinforcing member of the steering apparatus according to the first embodiment of the present application.

FIG. 7 is an exploded perspective view illustrating the reinforcing member 8 that reinforces the restriction of the movement, in the telescopic direction, of the steering apparatus 1 according to the first embodiment of the present application. In FIG. 7, the leftward lower side corresponds to the rear side of the vehicle, while the rightward upper side corresponds to the front side of the vehicle.

The reinforcing member 8 is configured to include the annular member 20, the inner friction plate 23, the couple of outer friction plates 24a, 24b and an intermediate friction plate 30.

The inner friction plate 23 composed of a metal plate member includes the fitting portion 23a fitted to the lower portion of the annular member 20, the rising portions 23b, 23c extending in the axial direction on laterally both sides thereof, and a couple of elongate hole portions 23f, 23g formed in the rising portions 23b, 23c and configuring elongate holes being elongate in the axial direction. A hole 23i for visually observing the pin 21 is formed in a central portion of the fitting portion 23a, and holes 23j, 23k, through which the foregoing screws 22a, 22b pass, are formed respectively on laterally both sides of the hole 23i. Upper end portions, on the rear side of the vehicle, of the rising portions 23b, 23c protrude more upward than other portions and are bent inward. Further, portions, extending inward from lower edges, of the rising portions 23b, 23c and a portion, being bent downward from the front side of the vehicle and extending toward the front side of the vehicle from the lower edge, of the fitting portion 23a are integrally formed, thus configuring a lower surface portion 23h as depicted in FIG. 3.

The outer friction plates 24a, 24b are composed of metal plate members and take substantially rectangular shapes. Elongate hole portions 25a, 25b fitted on the protruded portions 20g, 20h are formed in portions, on the rear side of the vehicle, of the outer friction plates 24a, 24b, and elongate hole portions 26a, 26b being elongate in the axial direction are formed corresponding respectively to the elongate hole portions 23f, 23g of the inner friction plate 23 on the more front side of the vehicle than the elongate hole portions 25a, 25b.

The intermediate friction plate 30 composed of the metal plate member includes: upwardly extended friction portions 30a, 30b interposed between the rising portions 23b, 23c of the inner friction plate 23 and the outer friction plates 24a, 24b; and a connecting portion 30c to connect together lower portions of the friction portions 30a, 30b. The friction portions 30a, 30b are formed respectively with round holes 30d, 30e through which the clamping bolt 10 passes.

The reinforcing unit 8 built up by the components described above is, as described above, configured by assembling the inner friction plate 23 and the outer friction plates 24a, 24b on the annular member 20. The assembly is made so that the annular member 20 fits on the inner column 3; the outer friction plate 24a, the friction portion 30a of the intermediate friction plate 30 and the rising portion 23b of the inner friction plate 23 are interposed between the side plate portion 6b of the vehicle-sided bracket 6 and the protruded portion 5b of the outer column 5; and the rising portion 23c of the inner friction plate 23, the friction portion 30b of the intermediate friction plate 30 and the outer friction plate 24b are interposed between the side plate portion 6c of the vehicle-sided bracket 6 and the protruded portion 5c of the outer column 5. The clamping bolt 10 passes through the elongate hole portion 26a of the outer friction plate 24a, the round holes 30d, 30e of the intermediate friction plate 30, the elongate hole portions 23f, 23g of the inner friction plate 23 and the elongate hole portion 26b of the outer friction plate 24b.

With the configuration described above, the steering apparatus 1 according to the first embodiment of the present application is capable of causing the clamping bolt 10 to move in the substantially vertical direction within the elongate holes formed in the side plate portions 6b, 6c of the vehicle-sided bracket 6 upon cancelling the clamping of the clamping bolt 10 by the driver's operating the operation lever 7, whereby the tilt adjustment can be made. Further, simultaneously with this operation, the inner friction plate 23 and the outer friction plates 24a, 24 are unlocked, and the inner column 3 being clamped by the clamp portion of the outer column 5 is also declamped, whereby the telescopic adjustment can be made.

On the other hand, when the driver performs the clamping operation using the clamping bolt 10 by operating the operation lever 7, the up-and-down movements of the clamping bolt 10 are restricted, resulting in inability of making the tilt adjustment. Furthermore, by dint of this clamping, the inner column 3 is firmly fixed owing to the fixation by the annular member 20 held by the inner friction plate 23 and the outer friction plates 24a, 24b in addition to the clamping by the clamp portion of the outer column 5.

The steering apparatus 1 according to the first embodiment is capable of absorbing the impact with the stable and low separating load even when a vehicle occupant having a relatively lightweight encounters the secondary collision.

Moreover, the steering apparatus 1 according to the first embodiment is capable of preventing occurrence of a moment in the annular member 20 upon the secondary collision because of the pin 21 being disposed in the vicinity of the portion, connected to the reinforcing member 8, of the annular member 20, and also preventing an increase in separating load due to the occurrence of the moment.

Furthermore, the steering apparatus 1 according to the first embodiment is capable of preventing fixing force caused by the friction from differing on the left side and the right side because of the inner friction plate 23 and the outer friction plates 24a, 24b being integrally configured via the annular member 20, and also preventing the increase in separating load due to the column being twisted upon the secondary collision.

Further, the steering apparatus 1 according to the first embodiment is capable of steering even after absorbing the impact of the secondary collision because of the column not coming off.

Still further, the steering apparatus 1 according to the first embodiment is capable of improving rigidity of the column against vibrations by the reinforcing member 8 firmly fixing the inner column 3, and also ensuring steering stability.

Second Embodiment

Next, the steering apparatus according to a second embodiment of the present application will be described with reference to FIGS. 8 to 12 inclusive. The steering apparatus according to the second embodiment has many components common to the steering apparatus according to the first embodiment discussed above, and, with the common components being marked with the same reference numerals and symbols as those of the steering apparatus in the first embodiment, the following discussion will be focused on only different portions from the first embodiment while omitting the redundant explanations.

Figure 8:
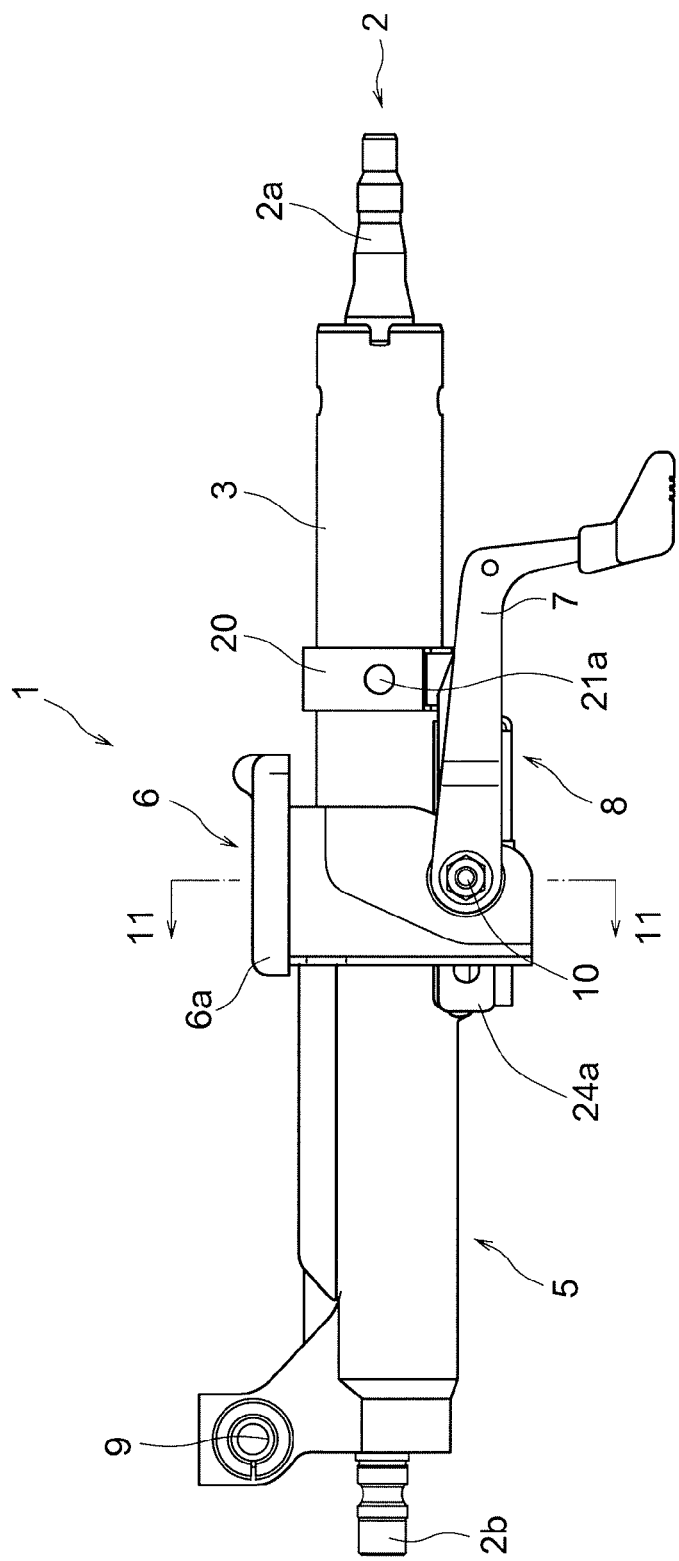
FIG. 8 is a side view of the steering apparatus according to a second embodiment of the present application.

FIG. 8 is a side view illustrating the steering apparatus 1 according to the second embodiment. As depicted in FIG. 8, in the steering apparatus 1 according to the second embodiment, the pin 21 is fitted to the side surface of the metallic annular member 20 fitting on the intermediate portion of the inner column 3 in the axial direction, and the annular member 20 is fixed to the inner column 3.

Figure 9:
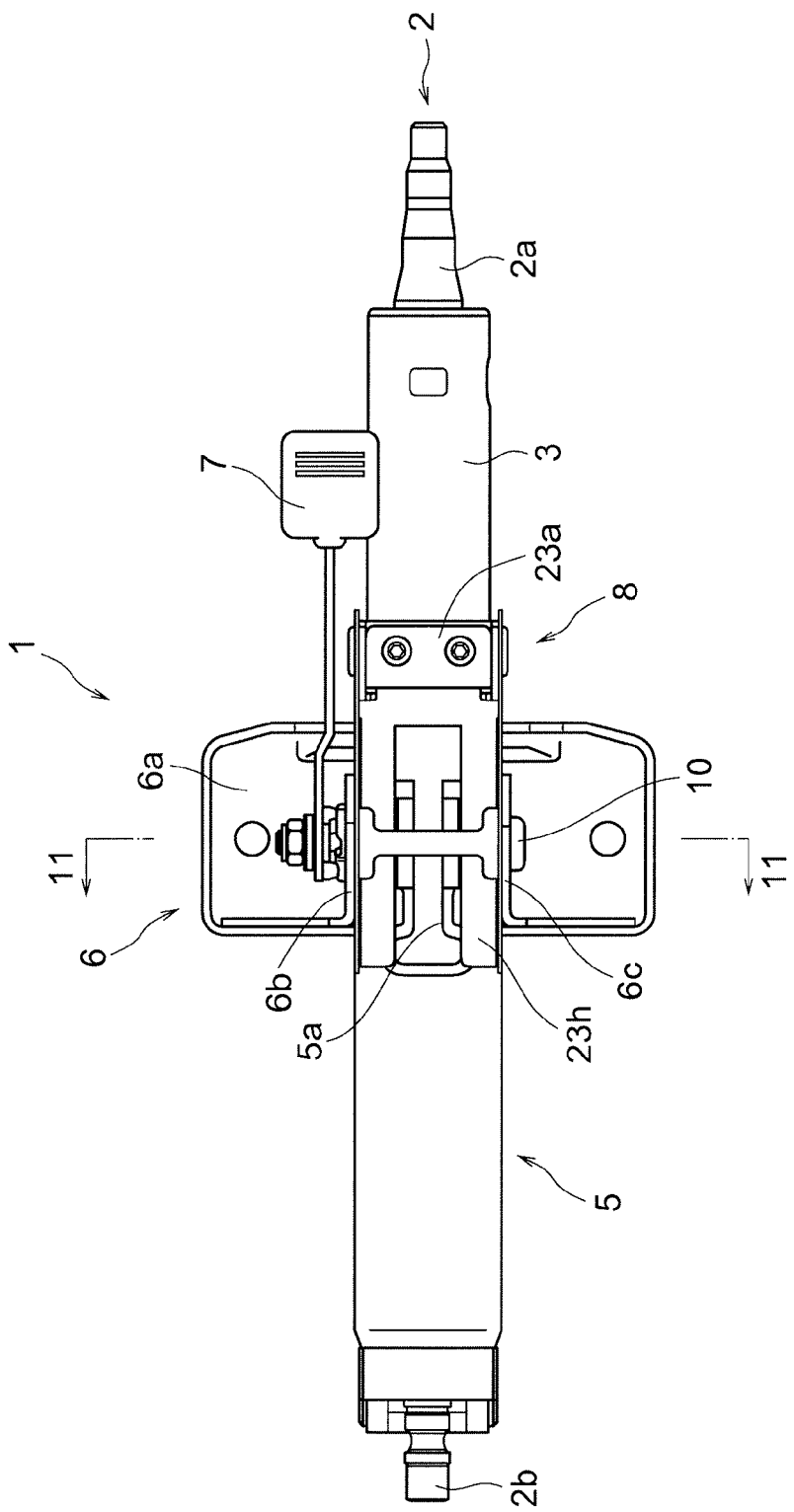
FIG. 9 is a bottom view illustrating the steering apparatus according to the second embodiment of the present application.

FIG. 9 is a bottom view illustrating the steering apparatus 1 according to the second embodiment. As illustrated in FIG. 9, in the steering apparatus 1 according to the second embodiment, the hole 21i for visually observing the pin is not formed in the fitting portion 23a configuring a part of the inner friction plate 23.

Figure 10:
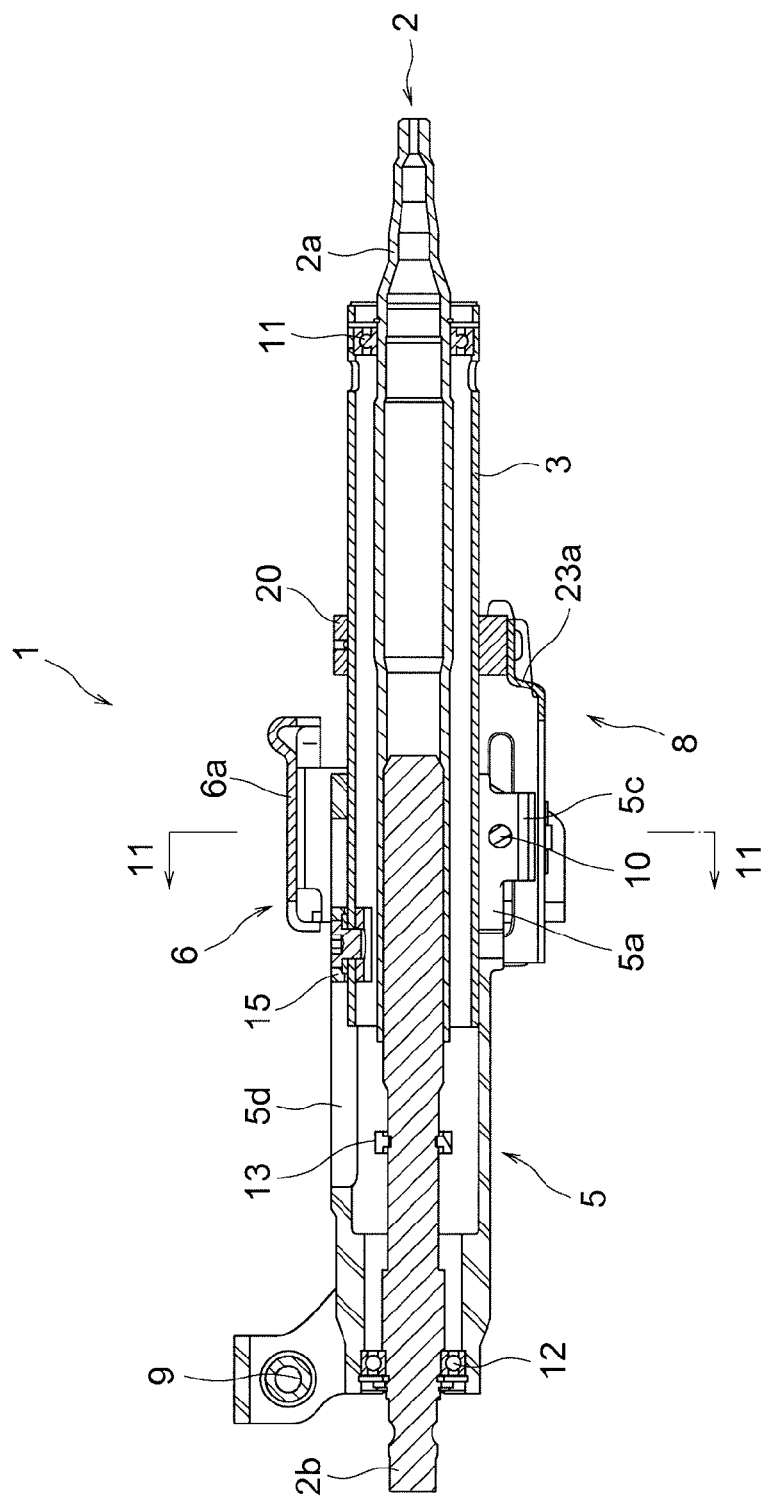
FIG. 10 is a sectional view illustrating a cut-off plane taken in the vertical direction along the central axis of the steering apparatus according to the second embodiment of the present application.

FIG. 10 is a sectional view illustrating cut-off plane given when cutting off the steering apparatus 1 according to the second embodiment vertically along the axial direction thereof. As depicted in FIG. 10, in the steering apparatus 1 according to the second embodiment, the pin is not fitted to the lower portion of the annular member 20 unlike the first embodiment discussed above.

Figure 11:
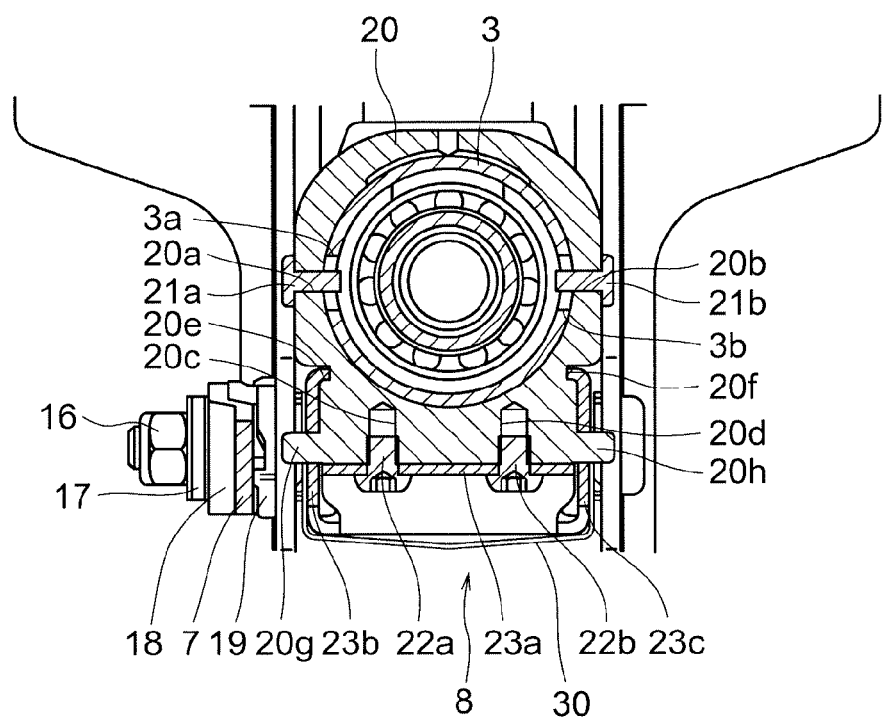
FIG. 11 is a sectional view, taken along a line 11-11 depicted in FIGS. 8 to 10 inclusive.

FIG. 11 is a sectional view taken along a line 11-11 depicted in FIGS. 8 through 10. As illustrated in FIG. 11, in the steering apparatus 1 according to the second embodiment, a couple of through-holes 20a, 20b penetrating in the radial direction are formed on laterally both sides of the annular member 20 in the widthwise direction of the vehicle. Further, a couple of through-holes 3a, 3b penetrating through in the radial direction are also provided in portions, corresponding to the through-holes 20a, 20b, of the inner column 3. Shearing pins 21a, 21b are inserted into the through-holes 20a, 20b, 3a, 3b provided in the annular member 20 and the inner column 3. The shearing pins 21a, 21b are configured to include disc-like heads and cylindrical shanks extending vertically on one sides from centers of the heads, the shanks being inserted into the through-holes 20a, 20b, 3a, 3b.

Figure 12:
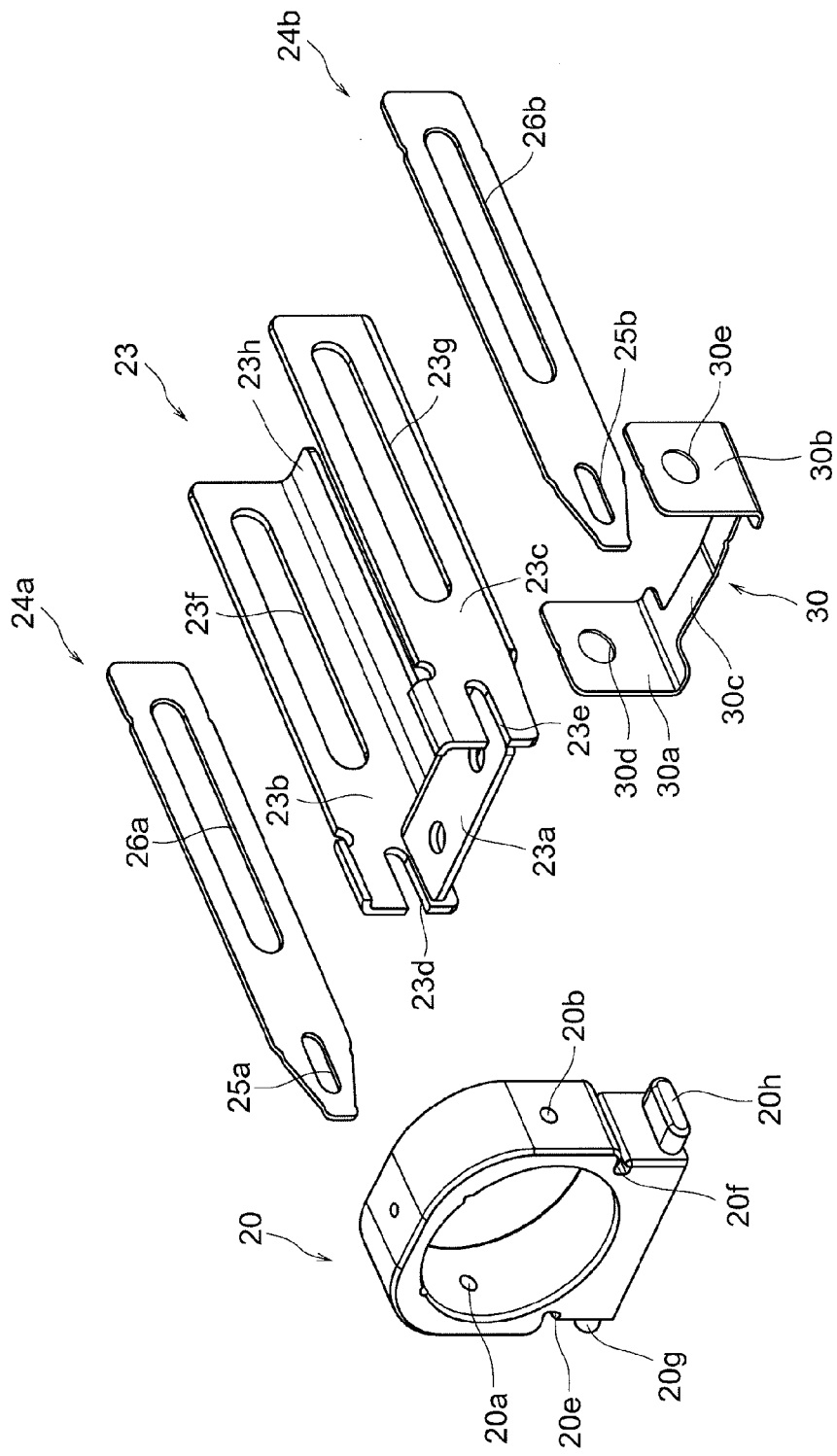
FIG. 12 is an exploded perspective view illustrating the reinforcing member of the steering apparatus according to the second embodiment of the present application.

FIG. 12 is an exploded perspective view illustrating the reinforcing member of the steering apparatus 1 according to the second embodiment. As described above, the holes 20a, 20b via which the pins are inserted into the annular member 20 are formed in the side surfaces but not formed in the lower portion. Moreover, the fitting portion 23a of the inner friction plate 23 does not have the hole 21i for visually observing the pin being inserted. The reinforcing member according to the second embodiment is assembled to the steering apparatus 1 in the same way as the reinforcing member according to the first embodiment is assembled except the positions of the pins.

According to the second embodiment having the configuration described above, the impact force acting toward the front side of the vehicle in the axial direction is generated in the inner column 3 upon the secondary collision that the driver collides with the steering wheel by a vehicle collision and so on. The shearing pins 21a, 21b are sheared by this impact force, resulting in cancelling the fixation of the inner column 3 by the annular member 20. The inner column 3 is thereby enabled to move toward the front side of the vehicle in axial direction by only the friction with the clamp portion of the outer column 5. Further, in the second embodiment, the fixation of the inner column 3 by the annular member 20 servers to eliminate the necessity for firmly clamping the inner column 3 by the clamp portion of the outer column 5 and to lessen the clamping of the clamp portion of the outer column 5. This contrivance reduces the friction force caused between the inner column 3 and the clamp portion of the outer column 5 upon the secondary collision, and decreases the separating load.

The steering apparatus 1 according to the second embodiment can acquire the same effects as those of the first embodiment. To be specific, it is feasible to prevent the moment from occurring in the annular member upon the secondary collision and also prevent the separating load from increasing due to the occurrence of the moment. Further, the inner friction plate 23 and the outer friction plates 24a, 24b are integrally configured via the annular member 20, and it is therefore possible to prevent the fixing force due to the friction from differing on the left side and the right side and also prevent the separating load from rising due to the column being twisted upon the secondary collision. Moreover, the steering can be performed because of the column not coming off even after absorbing the impact of the secondary collision. In addition, the reinforcing member 8 firmly fixes the inner column 3, whereby the rigidity of the column against the vibrations can be improved and the steering stability can be ensured.

In addition to what has been described so far, according to the second embodiment, even when the load causing the column move upward is applied upon the secondary collision, the stable separating load can be acquired without any variation of the separating load.

The discussion has been made so far by exemplifying the specific embodiments for describing the invention of the present application, however, a variety of modifications and improvements can be attained without being limited to the embodiments described above.

For example, in the first embodiment, the pin 21 does not necessarily prevent the come-off with the aid of the fitting portion 23a of the inner friction plate 23, and other come-off preventive means may also be taken. For example, the pin 21 may be press-fitted in the through-hole.

Furthermore, in the first embodiment, as described above, it is preferable to provide the hole 23i for visually observing the pin 21, however, the hole 23i is not necessarily provided.

Moreover, in the second embodiment, as described above, the shearing pins 21a, 21b may be, though preferably provided in the vicinity of the connecting portion between the inner friction plate 23, the outer friction plates 24a, 24b and the annular member 20, provided at both of the bilateral portions and the lower portions thereof without being limited to the left and right sides in the widthwise direction of the vehicle as in the embodiments described above. Moreover, the number of shearing pins may be set "1" or equal to or more than "3" without being limited to "2".

The pin for fixing the annular member 20 can be molded of resin to reduce the weight and can be thus sized to a degree not causing any obstacle against the assembly, and, though come-off preventive molding can be also carried out, metallic pins and aluminum pins are also available for use.

Furthermore, as for the number of friction plates, without being limited to the two plates on one side with the intermediate friction plate 23 being sandwiched, an available configuration is that the single friction plate is provided on one side without providing the intermediate friction plate 23 or that the three or more friction plates are provided on one side while providing the two or more intermediate friction plates. Further, the friction plates may be disposed on any one side and may also be disposed outwardly of the side plate portions 6b, 6c of the vehicle-sided bracket 6.

As described above, the present invention can provide the steering apparatus capable of acquiring the more stable and lower separating load.

DESCRIPTION OF THE REFERENCE NUMERALS AND SYMBOLS

1: steering apparatus
2: steering shaft
2a: upper shaft
2b: lower shaft
3: inner column
3a, 3b: hole
5: outer column
6: vehicle-sided bracket
6a: upper plate portion
6b, 6c: side plate portion
7: operation lever
8: reinforcing member
9: tilt pivot
10: clamping bolt
11: rear-sided bearing
12: front-sided bearing
13: stopper
14a, 14b: elongate hole
15: spacer
16: nut
17: thrust bearing
18: movable cam
19: fixed cam
20: annular member
20a, 20b: hole
20c, 20d: screw hole
20e, 20f: recessed portion
20g, 20h: protruded portion
21: pin
21a, 21b: shearing pin
22a, 22b: screw
23: inner friction plate
23a: fitting portion
23b, 23c: rising portion
23d, 23e: open slot
23f, 23g: elongate hole portion
23h: lower surface portion
23i: hole
23j, 23k: hole
24a, 24b: outer friction plate
25a, 25b: elongate hole portion
26a, 26b: elongate hole portion
30: intermediate friction plate
30a, 30b: friction portion
30c: connecting portion
30d, 30e: round hole
32: stopper

What is claimed is:

1. A steering apparatus comprising:
    a steering shaft transferring steering force;
    an inner column rotatably supporting the steering shaft;
    an outer column supporting the steering shaft rotatably and including a clamp portion clamping the inner column while being fitted on the inner column in a relatively movable manner in an axial direction;
    a vehicle-sided bracket pinching and fixing the clamp portion to a vehicle body; and
    a fastening mechanism fixing the inner column and the outer column by fastening the vehicle-sided bracket and the clamp portion in accordance with an operation of a user, then cancelling the fixation and thus enabling adjustments in tilt and telescopic directions of a steering wheel,
    wherein the steering apparatus further comprises: a friction plate fastened by the fastening mechanism together with the clamp portion and the vehicle-sided bracket; and an annular member being fitted on the inner column and connected to the friction plate,
    the annular member and the inner column are formed with through-holes penetrating the annular member and the inner column in the vicinity of a connecting portion between the friction plate and the annular member, and are connected by a pin inserted into the through-holes, and
    the pin is fractured upon receiving a predetermined level of impact force, resulting in canceling the connection between the annular member and the inner column.

2. The steering apparatus according to claim 1, wherein the friction plate and the annular member are connected by a fitting portion formed on the friction plate and fixed in surface-contact with an outer peripheral surface of the annular member, and
 the fitting portion blocks at least a part of the through-hole of the annular member.

3. The steering apparatus according to claim 2, wherein the fitting portion includes a hole for visually observing the pin, the hole being formed in a portion facing the pin.

4. The steering apparatus according to claim 3, wherein the pin is configured to include a resin.

5. The steering apparatus according to claim 2, wherein the pin is configured to include a resin.

6. The steering apparatus according to claim 1, wherein the connecting portion and the through-hole are formed in a lower portion of the annular member.

7. The steering apparatus according to claim 4, wherein the pin is configured to include a resin.

8. The steering apparatus according to claim 1, further comprising a second pin, the annular member and the inner column being each formed with a second through-hole into which the second pin is inserted, the through-hole and the second through-hole being formed in side surfaces in a face-to-face relationship in radial directions.

9. The steering apparatus according to claim 8, wherein the pin is configured to include a resin.

10. The steering apparatus according to claim 1, wherein the pin is configured to include a resin.

* * * * *